Figure 4:
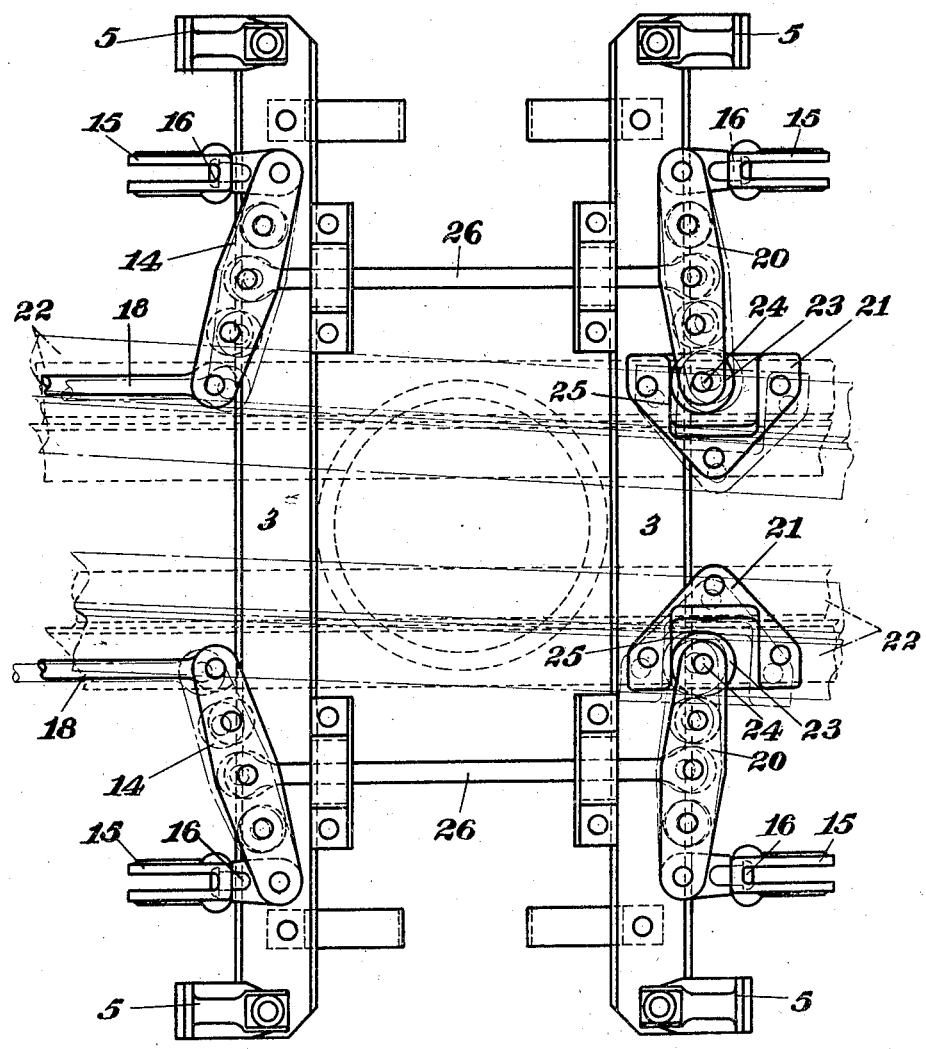

Jan. 8, 1924.
B. F. KURTZ
1,479,820
BRAKE MECHANISM
Filed Oct. 7, 1921
3 Sheets-Sheet 1
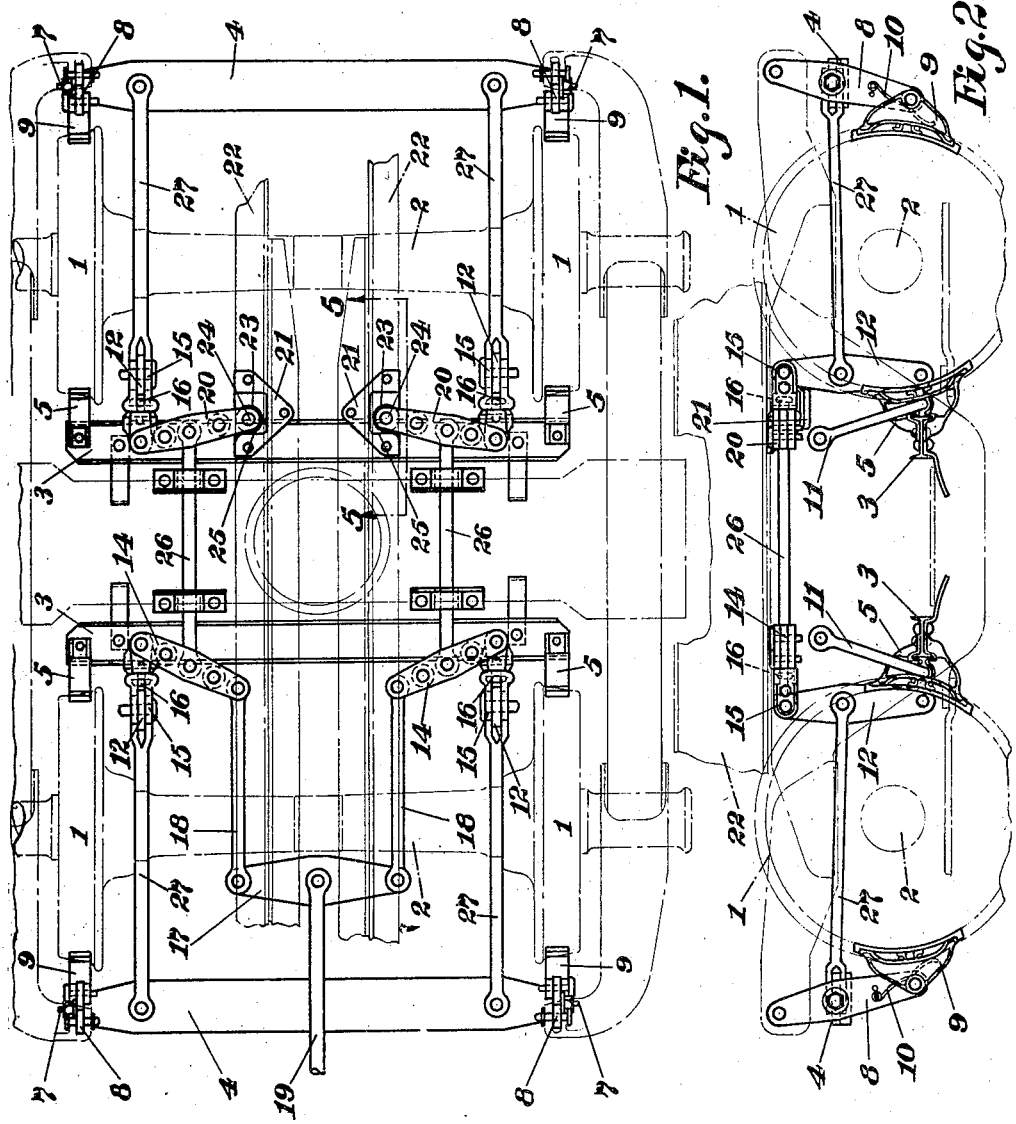
Witnesses
Edythe Lambe
Alice Smith
By
Inventor
Benjamin F. Kurtz
Attorney

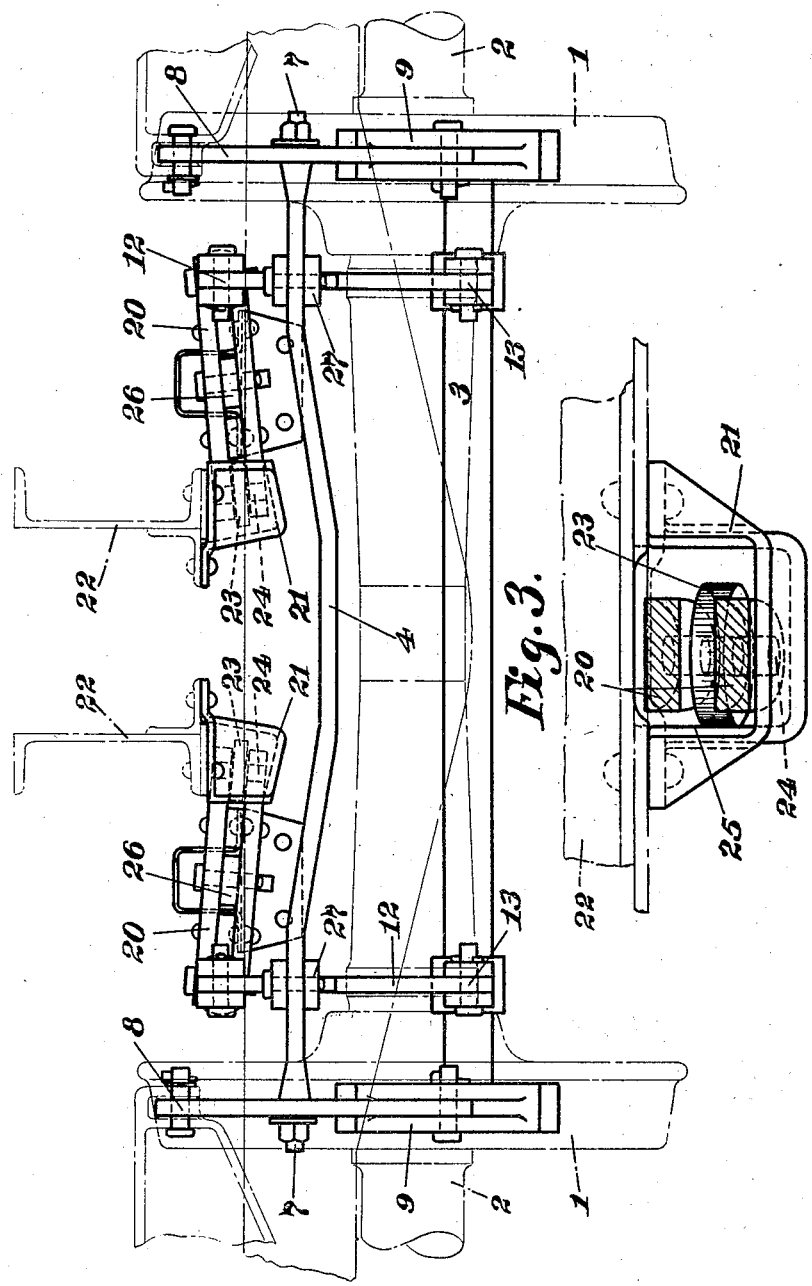

Patented Jan. 8, 1924.

1,479,820

UNITED STATES PATENT OFFICE.

BENJAMIN F. KURTZ, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

Application filed October 7, 1921. Serial No. 506,153.

*To all whom it may concern:*

Be it known that I, BENJAMIN F. KURTZ, a citizen of the United States, residing at Avalon, in the county of Allegheny and State of Pennsylvania, have invented certain new and useful Improvements in Brake Mechanism, of which the following is a specification.

This invention relates to brakes for railway cars and more particularly to the type known as clasp brakes which are connected to the body of the car and to the truck, and has for an object the provision of means for connecting a portion of the brake to the car body in such a manner that relative movement between the brake and the car body is permitted so that the brake will not be affected by the angularity of the truck relative to the car body when the car to which the brake is applied is rounding a curve in the track, and will, at the same time, obviate any binding or bending action between the levers and rods of the brake due to such angularity of the truck.

Another object of the invention is to provide a clasp brake having a fulcrum bracket rigidly secured to the car body and a compensating connection between two of the dead levers of said brake and the fulcrum brackets to enable the same operative proportionate leverage to be maintained when the car to which the brake is applied is rounding a curve.

These and other objects will be apparent from the following description:

Referring to the drawings in which like reference characters refer to like parts, Fig. 1 is a plan view of the brake applied to the body and truck of a railway car, the truck frame, wheels and axles of the truck and the center sills of the body being shown in dot and dash lines; Fig. 2 is a side elevational view of the same; Fig. 3 is an enlarged end elevational view of the same; Fig. 4 is an enlarged detail plan view of a portion of the brake connected with the truck and body of a car, the full lines illustrating the brake in its normal position when the truck is traveling on straight track and the dot and dash lines illustrating the position of the brake when the truck is rounding a curve. To simplify this view and to illustrate the action of the brake when the truck is rounding a curve the position of the center sills have been changed instead of changing the position of the truck and the brake as a whole. Fig. 5 is an enlarged sectional view of the fulcrum bracket and the horizontal brake lever taken on the line 5—5 of Fig. 1.

Referring now in detail to the drawings in which like reference characters refer to like parts the reference character 1, indicates the wheels of a car truck which are mounted on axles 2 in the usual manner, such axles being journaled in the truck frame in any suitable manner.

Each pair of wheels is provided with brake beams 3 and 4, the beam 3 being arranged at one side of one of the pairs of wheels and the beam 4 at the opposite side of such pairs. The beams 3 may be of any suitable form but as illustrated in the drawings preferably comprise members of I form in cross section the webs of which are horizontally disposed, each of which beams is preferably of such a length as to extend from wheel to wheel transversely of the truck. At each end of the beam a brake shoe head 5 is secured, each of which heads has secured thereto a brake shoe 6 which is adapted to engage one of the wheels. The beams 4 may also be of any suitable form but as illustrated in the drawings each beam preferably comprises a rectangular bar which is horizontally disposed and is preferably of such a length as to extend from wheel to wheel transversely of the truck. The end portions of these beams 4 are provided with trunnions 7, on which the vertically disposed dead levers 8 are loosely mounted. Above the beam 4 each of the dead levers 8 is anchored to a part of the truck frame, and below the beam each of these levers is provided with a brake shoe head 9 which in turn is provided with a brake shoe which is adapted to engage one of the wheels.

This brake shoe head is pivotally connected with the lever and is held in its proper position relative to the wheel by means of a spring member 10 one end of which is secured to the lever 8 and the opposite end portion arranged to engage the brake shoe head.

To support the beams 3, hangers 11 are provided, one end of each of which is pivotally secured to the truck frame and the other end to the brake shoe head or to any other suitable part of the brake beam, while the dead levers 8 support the brake beams 4.

Between the wheels of each pair of wheels, vertically disposed live levers 12 are provided each of which at its lower end is pivotally connected with one of the brake beams 3 as indicated at 13. The upper end of each of these levers 12 at one end of the truck are connected with one end of a horizontally disposed floating lever 14 through the medium of a clevis 15 and pin 16 such pin being loosely mounted in the clevis, the opposite end of the floating lever being connected with one end of an equalizer lever 17 through the medium of a rod 18 which equalizer in turn is connected with the pull rod 19. The upper end portion of each of these levers 12 at the opposite end of the truck are connected with one end of a horizontally disposed dead lever 20 through the medium of a clevis 15 and pin 16 the opposite end of such lever being loosely mounted in a fulcrum bracket 21. This fulcrum bracket is preferably secured to the center sills 22 of the car body but if desired may be secured to any other suitable part of the car body, and when so secured forms a recess for the reception of the end portion of the dead lever 20 and a roller 23 which is mounted on a pin 24 that passes through the lever, and is adapted to engage a vertical disposed portion 25 of the bracket. It will be noted that there is no bolt or like connection between the lever and the fulcrum bracket and that movement of the brake relative to the car body will be permitted without causing the several parts of the brake to bind on each other or to become accidentally bent or broken due to such movement. At each side of the longitudinal center line of the truck and of the brake the floating lever 14 is connected with the horizontally disposed dead lever 20 through the medium of a rod 26 which is connected with the levers intermediate their ends.

In the drawings the equalizer lever 17 has been illustrated as being connected with the floating levers 14 by the rods 18 but it will be understood that if desired these rods may be omitted and the equalizer lever secured directly to the levers 14.

The brake beams 4 are arranged in a plane above the brake beams 3 such beams 3 being connected with the levers 8 by rods 27 such rods at one end being connected with the levers 12 at a point intermediate their ends.

It will be noted that as the truck rounds a curve the rollers 23 will engage and roll on the portion 25 of the fulcrum bracket.

It will be apparent to those skilled in the art to which this invention appertains that changes may be made in the construction and arrangement of the several parts forming the brake rigging without departing from the spirit and scope of the appended claims.

Having thus described the invention what I claim as new and desire to secure by Letters Patent is:—

1. The combination with a car body and a truck, of a brake mounted on said truck, said brake comprising a plurality of levers engaging said body but not secured thereto.

2. The combination with a car body and a truck, of a brake mounted on said truck, a bracket mounted on said body, and a brake lever engaging said bracket but not secured thereto.

3. The combination with a car body, of center sills forming a part thereof, brackets secured to said sills and depending therebelow, and brake levers loosely mounted in said brackets adapted to compensate for relative movement between said body and levers.

4. The combination with a car body and a truck of a brake mounted on said truck, a bracket mounted on said body and a brake lever loosely connected with but not secured to said bracket to compensate for relative movement between said body and truck.

5. The combination with a car body, of center sills forming a part thereof, brackets secured to said sills and depending therebelow, a truck, a brake mounted on said truck, said brake comprising a plurality of levers adapted to engage said brackets below said sills the connections between said brackets and levers being adapted to automatically compensate for relative movement between said body and truck.

6. The combination with a car truck, of a brake rigging carried by said truck said brake rigging comprising a plurality of vertically disposed live levers and a plurality of horizontally disposed dead levers, and swivel connetions between the adjacent ends of said levers, each of said connections comprising a clevis and a member rotatably mounted in said clevis.

7. The combination with a car body and a truck, of a brake rigging carried by said truck and connected with said body to compensate for relative movement between said body and truck, said brake rigging comprising a plurality of horizontally disposed dead levers one end of each of which loosely engages said body, a plurality of vertically disposed live levers, and swivel connections between the adjacent ends of said levers whereby power may be applied to said levers to release or apply said brake.

8. The combination with a car truck, of a brake rigging carried by said truck, said brake rigging comprising a horizontally disposed dead lever and a vertically disposed live lever, and a connection between the adjacent ends of said levers forming a universal joint adapted to permit angular movement of one lever relative to the other.

9. The combination with a car truck of a brake rigging carried by said truck, and comprising two sets of connected levers and rods one set arranged adjacent each side of the truck, each of said sets comprising a horizontally disposed dead lever, a horizontally disposed live lever, a rod connecting said levers, a plurality of vertically disposed live levers, swivel connections, between the adjacent ends of said dead lever and one of said vertically disposed live levers and a swivel connection between the adjacent ends of said horizontally disposed live lever and the other of said vertically disposed live levers.

10. The combination with a car body and a truck, of a brake rigging carried by said truck, said brake rigging comprising two sets of connected levers and rods, one set being arranged at each side of the truck each set comprising a dead lever having a connection with said body adapted to automatically compensate for relative horizontal movement between said lever and body, a live lever, and a connection between the adjacent ends of said levers forming a universal joint adapted to compensate for relative angular movement between said levers.

In testimony whereof I affix my signature in the presence of two witnesses.

BENJAMIN F. KURTZ.

Witnesses:
  EDYTHE LAMBE,
  M. J. STEELE.